US008621042B2

(12) United States Patent
Eggleston et al.

(10) Patent No.: US 8,621,042 B2
(45) Date of Patent: Dec. 31, 2013

(54) ANYCAST REDIRECT TO UNICAST CONTENT DOWNLOAD

(75) Inventors: Jason Eggleston, Newport Beach, CA (US); Bradley B. Harvell, Chandler, AZ (US); Mohan I. Kokal, Peoria, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 50 days.

(21) Appl. No.: 13/344,497

(22) Filed: Jan. 5, 2012

(65) Prior Publication Data

US 2012/0166591 A1 Jun. 28, 2012

Related U.S. Application Data

(63) Continuation of application No. PCT/US2010/062156, filed on Dec. 27, 2010.

(51) Int. Cl.
*G06F 15/16* (2006.01)

(52) U.S. Cl.
USPC ........... 709/218; 709/223; 709/224; 709/225; 709/227; 709/245; 370/389; 370/254

(58) Field of Classification Search
USPC ................ 709/218, 219, 223, 226, 227, 245; 370/389, 254
See application file for complete search history.

(56) References Cited

U.S. PATENT DOCUMENTS

| | | | |
|---|---|---|---|
| 7,730,187 B2 | 6/2010 | Raciborski et al. | |
| 7,797,426 B1 | 9/2010 | Lyon | |
| 2002/0004846 A1* | 1/2002 | Garcia-Luna-Aceves et al. | 709/245 |
| 2003/0105865 A1* | 6/2003 | McCanne et al. | 709/225 |
| 2006/0018317 A1* | 1/2006 | Jimmei | 370/389 |
| 2007/0118667 A1 | 5/2007 | McCarthy et al. | |
| 2008/0123640 A1* | 5/2008 | Bhatia et al. | 370/389 |
| 2008/0235400 A1* | 9/2008 | Slocombe et al. | 709/245 |
| 2009/0013083 A9 | 1/2009 | Garcia-Luna-Aceves et al. | |
| 2009/0113057 A1* | 4/2009 | Van der Merwe et al. | 709/227 |
| 2010/0121945 A1 | 5/2010 | Gerber et al. | |
| 2010/0161799 A1 | 6/2010 | Maloo | |

(Continued)

OTHER PUBLICATIONS

Kuro5hin "Anycast Addressing on the Internet" Retrieved on Mar. 6, 2012 from http://aharp.ittns.northwestern.edu/papers/k5-anycast/index.html, 2004, p. 1-4.

(Continued)

*Primary Examiner* — Thuong Nguyen
(74) *Attorney, Agent, or Firm* — Kilpatrick Townsend & Stockton LLP

(57) ABSTRACT

A method and system for delivering content with a content delivery network (CDN) to a user computer is disclosed. After an initial request to a point of presence (POP) of the CDN for the location of the content object, an Anycast Internet protocol (IP) address is assigned. The user computer requests the content object which may find its way to the same or a different POP depending on what is closer in Internet terms. The request returns a POP-specific IP in a redirect such that the request resolves to the POP referenced in the immediately preceding sentence. One or more edge servers deliver the content object to the user computer.

20 Claims, 10 Drawing Sheets

(56) References Cited

U.S. PATENT DOCUMENTS

2010/0299437 A1* 11/2010 Moore ............................ 709/226
2011/0055316 A1   3/2011 Van Der Merwe et al.
2011/0072127 A1*  3/2011 Gerber et al. ................. 709/224
2011/0082916 A1   4/2011 Swanson et al.
2011/0099259 A1*  4/2011 Lyon ............................. 709/223
2011/0153736 A1*  6/2011 Sivasubramanian et al. . 709/203
2012/0066360 A1*  3/2012 Ghosh ........................... 709/223
2012/0215915 A1*  8/2012 Sakata et al. .................. 709/224
2012/0303818 A1* 11/2012 Thibeault et al. ............. 709/226

OTHER PUBLICATIONS

International Search Report dated Sep. 26, 2011 for PCT International Application No. PCT/US2010/062156, 10 pages.

* cited by examiner

ANYCAST REDIRECT TO UNICAST CONTENT DOWNLOAD

This application is related by priority to: PCT/US10/062156 filed Dec. 27, 2010, entitled "ANYCAST REDIRECT TO UNICAST CONTENT DOWNLOAD," and Australian Patent No. 2011200629 issued Nov. 17, 2011, entitled "ANYCAST REDIRECT TO UNICAST CONTENT DOWNLOAD;" both of which are hereby incorporated by reference in their entirety for all purposes.

BACKGROUND

This disclosure relates in general to a content delivery network (CDN) and, but not by way of limitation, to selection of an edge server for a CDN.

CDNs will use Anycast to find a point of presence (POP) that can deliver content hosted or cached by the CDN. To find the POP, a user computer will query a domain name service (DNS) that may or may not be close in network terms to the user computer. A POP can be assigned that is inefficient because the DNS was located in an unexpected place on the Internet masking the network location of the user computer. An inefficient POP negatively affects quality of service (QoS) perceived by the user. Anycast DNS is desirable because it is fast.

Anycast can be used to choose the edge server. The edge server is often in close network proximity to the location of the user's DNS and hopefully the user computer. During download of large files or playback of long streams, clients can have problems staying connected to an assigned edge server. Unexpectedly changing to another edge server because of Anycast route changes or server selection can interrupt the download or stream.

Within a network, HTTP proxy caches are used to relay information. In some cases, there are multiple layers of HTTP proxy caches to move a content object. Each extra hop of multiple proxy layers in a route consumes bandwidth. Ethernet bandwidth is relative plentiful, but can still become overloaded.

SUMMARY

In one embodiment, the present disclosure provides a method and system for delivering content with a content delivery network (CDN) to a user computer. After an initial request to a point of presence (POP) of the CDN for the location of the content object, an Anycast Internet protocol (IP) address is assigned. The user computer requests the content object which may find its way to the same or a different POP depending on what is closer in Internet terms. The request returns a POP-specific IP address in a redirect such that the request resolves uniquely to the POP referenced in the immediately preceding sentence. One or more edge servers deliver the content object to the user computer.

In another embodiment, the present disclosure provides a method for assigning a server of a content delivery network (CDN). A request for a content object is received at a first point of presence (POP), which is one of a plurality of POPs that comprise the CDN and are distributed across the Internet. A first Internet protocol (IP) address is returned, which could route to any of the plurality of POPs using Anycast. The request is received at a second POP using the first IP address. A user computer is redirected to request the content object from the second POP with a second IP address unique to the second POP. The request is received at the second POP using the second IP address. The server associated with the second IP address is determined. The content object is served from the second POP using the server to the user computer.

In yet another embodiment, the present disclosure provides a machine-readable physical medium having machine-executable instructions, comprising code for:
receiving a request for a content object at a first point of presence (POP), which is one of a plurality of POPs that comprise the CDN and are distributed across the Internet;
returning a first Internet protocol (IP) address, which could route to any of the plurality of POPs using Anycast;
receiving the request at a second POP using the first IP address;
redirecting a user computer to request the content object from the second POP with a second IP address unique to the second POP;
receiving the request at the second POP using the second IP address;
determining the server associated with the second IP address; and
serving the content object from the second POP using the server to the user computer.

In still yet another embodiment, the present disclosure provides a CDN for delivering a plurality of content objects to user computers. The CDN includes: a plurality of POPs distributed across the Internet including a first POP and a second POP, a domain name service to return a first Internet protocol (IP) address, switch fabric that receives the request at a second POP using the first IP address, and a plurality of servers that redirect a user computer to request the content object from the second POP with a second IP address unique to the second POP. The first IP address could route to any of the plurality of POPs using Anycast. The first IP address is associated with a request for a content object at the first POP. The plurality of servers include a server the second POP receives the request at the second IP address. The switch fabric determines the server associated with the second IP address. The server delivers the content object from the second POP to the user computer.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
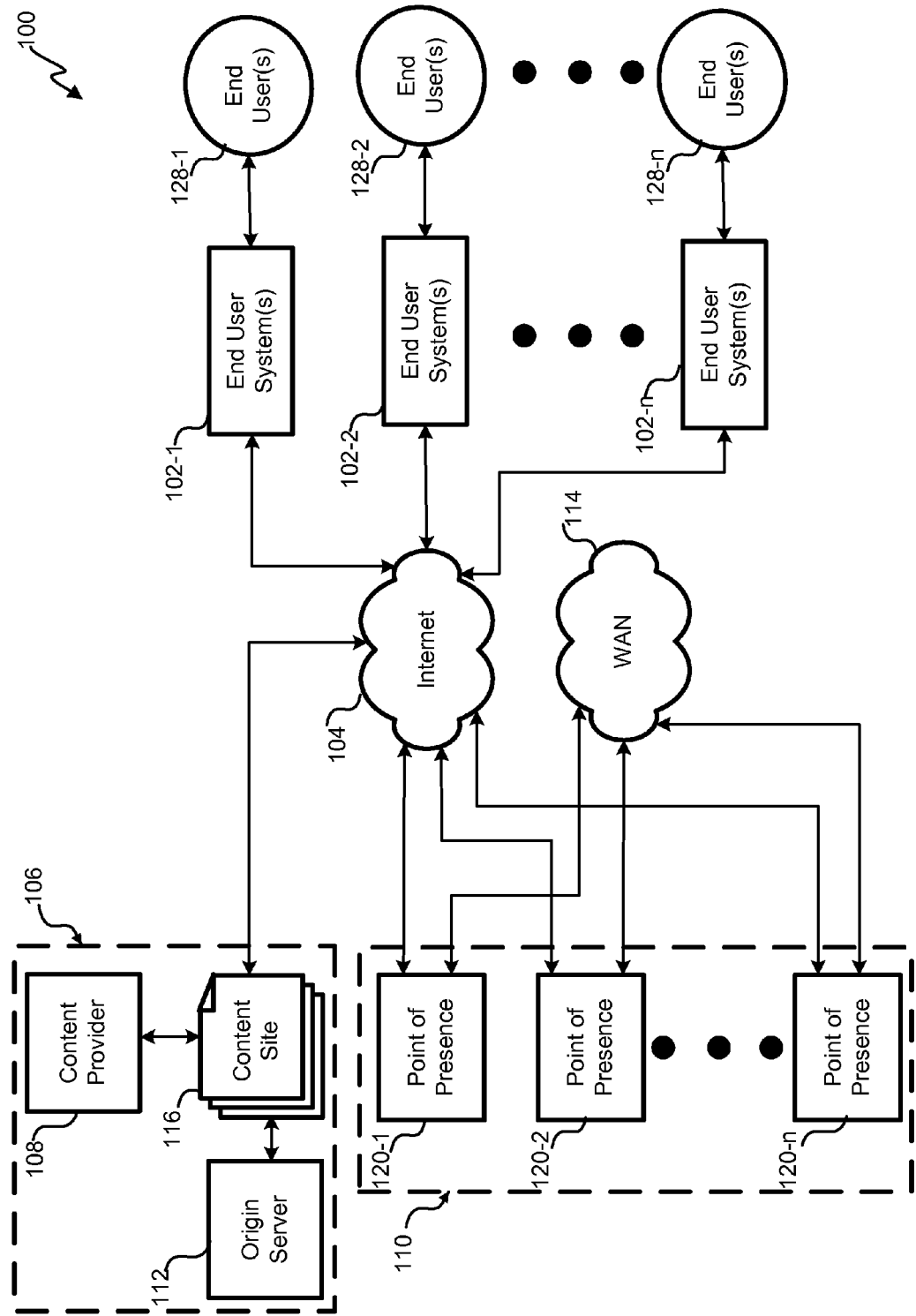
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and includes a content provider 108, a content site 116, and an origin server 112. The CDN 110 can cache, redistribute and/or host content in various embodiments for third parties such as the content originator 106 to offload delivery and typically provide better quality of service (QoS).

In this embodiment, the content distribution system 100 locates the content objects (or portions thereof) and distributes the content objects to an end user system 102. The content objects are dynamically cached or processed within the CDN 110 to improve the QoS without necessarily replicating the whole content object, unless subsequently requested by the end user 128. A content object is any content file or content stream and could include, for example, video, pictures, data, audio, software, and/or text. The content object could be live, delayed or stored. Throughout the specification, references may be made to a content object, content, content stream and/or content file, but it is to be understood that those terms could be used interchangeably wherever they may appear.

Many content providers 108 use a CDN 110 to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 to be proximate to end user systems 102. Multiple POPs 120 use the same IP address such that an Anycast routing scheme is used to find a POP 120 likely to be close, in network terms, to the end user for each request. In addition to the Internet 104, a wide area network (WAN) 114 or other backbone may couple the POPs 120 with each other and also couple the POPs 120 with other parts of the CDN 110.

When an end user 128 requests a web page through its respective end user system 102, the request for the web page is passed either directly or indirectly via the Internet 104 to the content originator 106. The content originator 106 is the source or re-distributor of content objects. The content site 116 is a web site accessible by the end user system 102. In one embodiment, the content site 116 could be a web site where the content is viewable with a web browser. In other embodiments, the content site 116 could be accessible with application software other than a web browser. In this embodiment, the content provider 108 directs content requests to a CDN 110 after they are made or formulates the delivery path by embedding the delivery path into the URLs for a web page. In any event, the request for content is handed over to the CDN 110 by using an Anycast IP address corresponding to one, two or more POPs 120.

Once the request for a content object is passed to the CDN 110, the request is associated with a particular POP 120 within the CDN 110 using the Anycast routing scheme. In some cases, the POP 120 found with Anycast is not particularly close to the end user system 102, being only close to the DNS server used by the end user system 102. The particular POP 120 may retrieve the portion of the content object from the content provider 108 if not already within the CDN 110. Alternatively, the content provider 108 may directly provide the content object to the CDN 110 and its associated POPs 120 through pre-population, i.e., in advance of the first request. In this embodiment, the content objects are provided to the CDN 110 and stored in one or more CDN servers such that the portion of the requested content may be served from the CDN 110. The CDN servers include edge servers that actually serve end user requests. The origin server 112 holds a copy of each content object for the content originator 106. Periodically, the content of the origin server 112 may be reconciled with the CDN 110 through a cache, hosting and/or pre-population algorithm. Some content providers 108 could use an origin server within the CDN 110 to host the content and avoid the need to maintain an accessible copy of the content object.

Once the content object is retrieved from the origin server 112 by the CDN 110, the content object is stored within the particular POP 120 and is served from that POP 120 to the end user systems 102. Streamed content objects can have real time or near real time information or can be previously stored. The end user system 102 receives the content object and processes it for use by the end user 128 or an automated processing systems. The end user system 102 could be a personal computer, media player, handheld computer, Internet appliance, phone, IPTV set top, web server, processing system, streaming radio or any other device that receives and/or plays content objects. In some embodiments, a number of the end user systems 102 could be networked together. Although this embodiment only shows a single content originator 106 and a single CDN 110, it is to be understood that there could be many of each in various embodiments.

Figure 2:
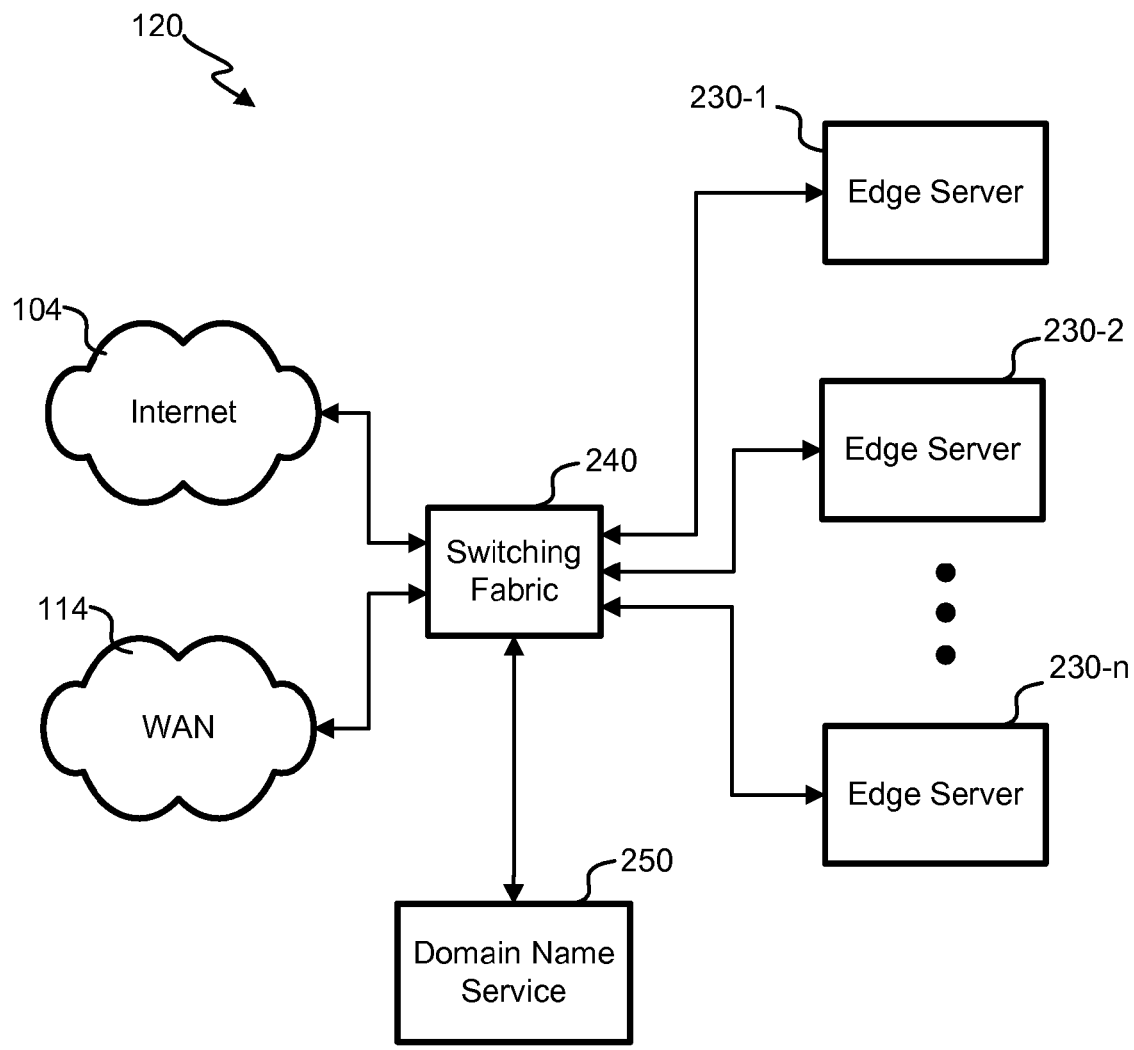
FIG. 2 depicts a block diagram of an embodiment of a point of presence (POP)

With reference to FIG. 2, a block diagram of an embodiment of a POP 120 is shown. There are a number of edge servers 230 coupled to each other and the Internet 104 and WAN 114 using switching fabric 240. Edge servers 230 number in the thousands in a given POP 120. They could be divided by function and/or customer. Loading algorithms can be used to divide load among the edge servers 230 in any number of ways. The edge servers 230 perform caching, streaming, hosting, storage, and/or other functions within the POP 120. An edge server 230 is typically a rack-mounted computer that could have varying levels of processing power, memory and storage. Software running on the edge server 230 includes, for example, HTTP proxy caching, media servers, Flash™ servers, Java™ application servers, Silverlight™ servers, etc.

The switching fabric 240 is used for several functions. Incoming requests for content objects are routed to the edge servers 230 using the switching fabric. This could be done using routing, redirection or domain name service (DNS). In this embodiment, requests are assigned to a virtual Internet protocol (VIP) address of the POP 120 that the switching fabric 240 assigns to a particular edge server 230 to service. Load balancing, round-robin, and/or other techniques could be used by the switching fabric 240 to route requests to edge servers 230.

Communication within the POP 120 also uses the switching fabric 240. Edge servers 230 could have multiple software applications running that communicate with other edge servers 230. For example, embodiments could have HTTP caching proxies arranged in different levels such that a cache on one edge server could communicate through another edge server to deliver a content object to an end user system 102.

The DNS 250 is used to assign an IP address or a Virtual (VIP) address to requests for domains or CNAMEs. The VIP address could be unique to the POP 120 or shared among a number of POPs 120 to allow Anycast routing of the request to a possibly closer POP 120. The DNS 120s as part of a domain resolution process that can include any number of DNS servers elsewhere on the Internet 104.

Figure 3A:
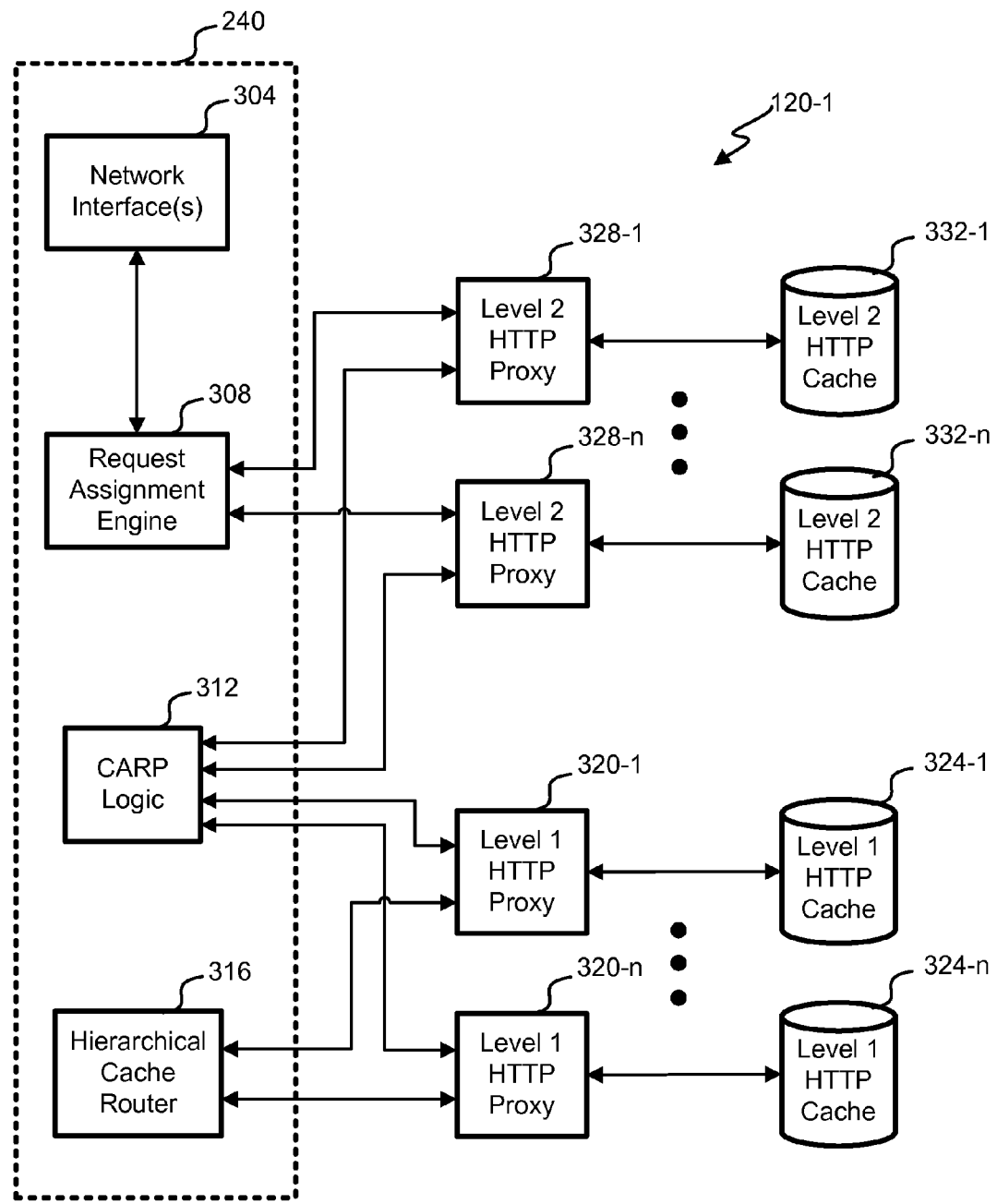
FIGS. 3A, 3B, 3C, and 3D depict functional block diagrams of embodiments of a POP.

Referring next to FIG. 3A, a functional block diagram of an embodiment of various functions within a POP 120-1 is shown. There are two levels of HTTP proxy caching in this embodiment where each HTTP proxy has an HTTP cache. The HTTP proxy caching may be performed on edge servers. Switching fabric 240 includes network interface(s) 304, a request assignment engine (RAE) 308, cache array routing protocol (CARP) logic 312, and a hierarchical cache router 316. Although the CARP logic 312 is shown separately for illustration purposes, in this embodiment, each level 2 HTTP proxy 328 has its own CARP logic 312 that can deterministically locate the level 1 HTTP proxy 320 to use on a cache miss. Other embodiments could have a separate server with the CARP logic 312.

The network interface 304 is coupled to the Internet 104 and/or WAN 114 to allow communication with the POP 120. The RAE 308 uses routing, DNS, round robin, random assignment, and/or load balancing to assign content object requests between a number of level 2 HTTP proxies 328. Each HTTP proxy 328 is coupled with a level 2 HTTP cache 332 that is generally small and configured for popular content. If a content object is found in the level 2 HTTP cache 332, it is coupled to the end user system 102 through the level 2 HTTP proxy 328.

Where the level 2 HTTP cache 332 does not store the content object, the level 2 HTTP proxy 328 uses the CARP logic 312 to be assigned a level 1 HTTP proxy 320 to locate the content object. The CARP logic 312 divides the name space between the level 1 HTTP proxy using a hash of the URL to deterministically find the level 1 HTTP proxy that handles requests for a particular content object. Other embodiments could divide the namespace by directory, customer, file type, etc.

The level 1 HTTP proxy 320 looks for the content object requested in its corresponding level 1 HTTP cache 324, which is typically larger than the level 2 HTTP cache 332. Where the content object is found on the level 1 HTTP cache 324, it is relayed through the level 1 HTTP proxy 320 and the level 2 HTTP proxy 328, etc. to the end user system 102. Should the content object not be located on the level 1 HTTP cache 324, the content object is located using the hierarchical cache router 316 and loaded onto the level 1 HTTP cache 324. The hierarchical cache router 316 is used to locate the content object elsewhere in the POP 120, CDN 110 or origin server 112.

Figure 3B:
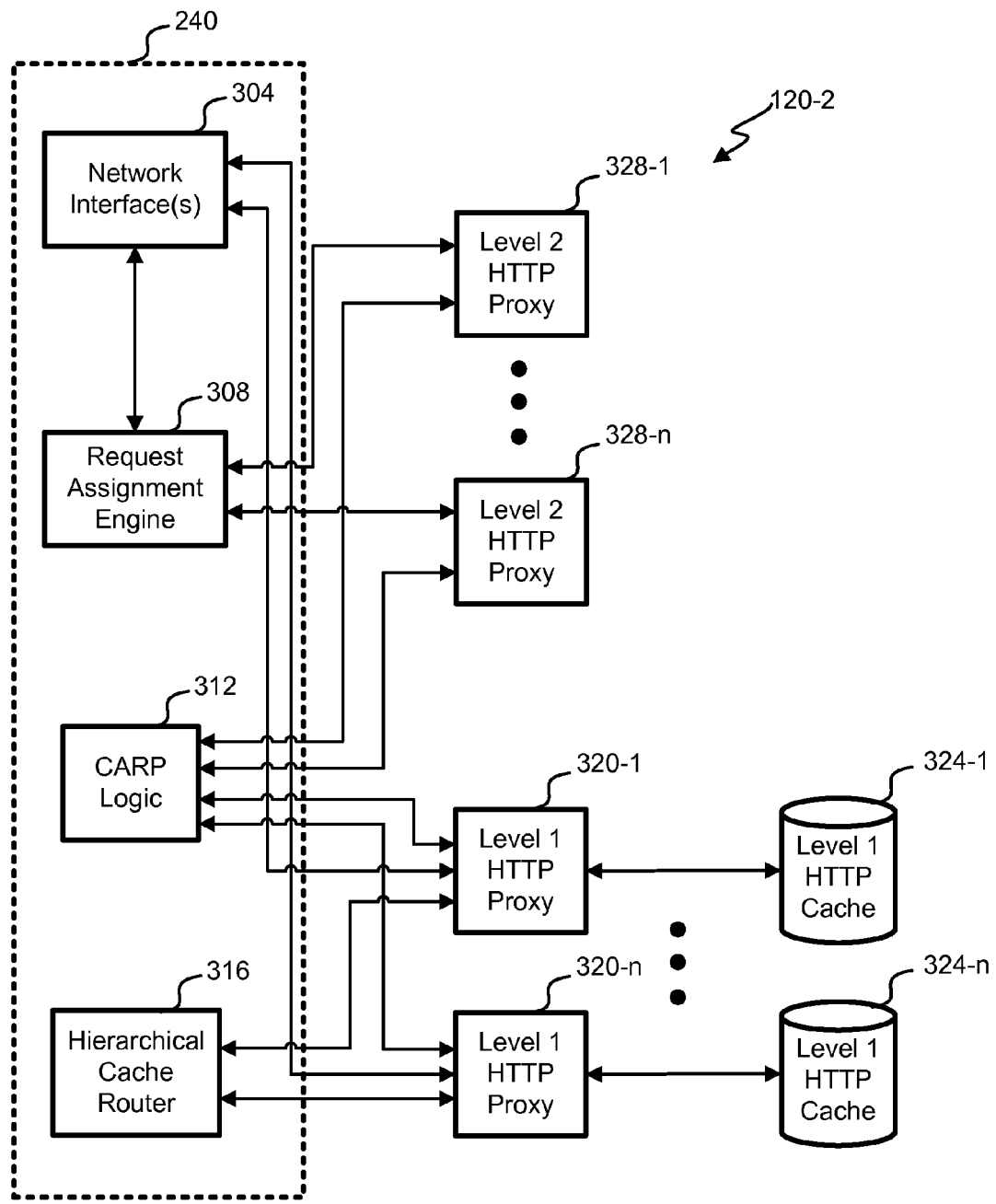

With reference to FIG. 3B, a functional block diagram of an embodiment of various functions within a POP 120-2 is shown. This embodiment does not have caching for the level 2 HTTP proxy 328. Content requests are assigned to the POP 120 using Anycast VIPs and converted to static VIPs unique to the POP 120. The Anycast VIPs are common to all or some of the POPs 120 in the CDN 110. When requested by the end user system 102 the are likely to find the POP 120 closest in Internet terms and likely to provide better QoS.

The request assignment engine 308 passes the content object request, typically a URL, to one of the level 2 HTTP proxies 328. In this embodiment, the level 2 HTTP proxies 328 do not have an associated cache. The level 2 HTTP proxy 328 uses the CARP logic 312 to pass the request to the level 1 HTTP proxy 320. The level 1 HTTP proxy 320 calculates a redirect URL that identifies the request uniquely and issues a 302-redirect back to the end user system 102 before closing the connection. Some embodiments could use a 301-redirect instead of a 302-redirect.

The redirect will cause the end user system 102 to request the URL directly from the level 1 HTTP proxy 320 without using Anycast. The network interface 304 sends those requests direct to the appropriate level 1 HTTP proxy 320 when received. As before, the level 1 HTTP proxy 320 will search the level 1 HTTP cache 324 for the content object before resorting to the hierarchical cache router 316 on a cache miss.

Figure 3C:
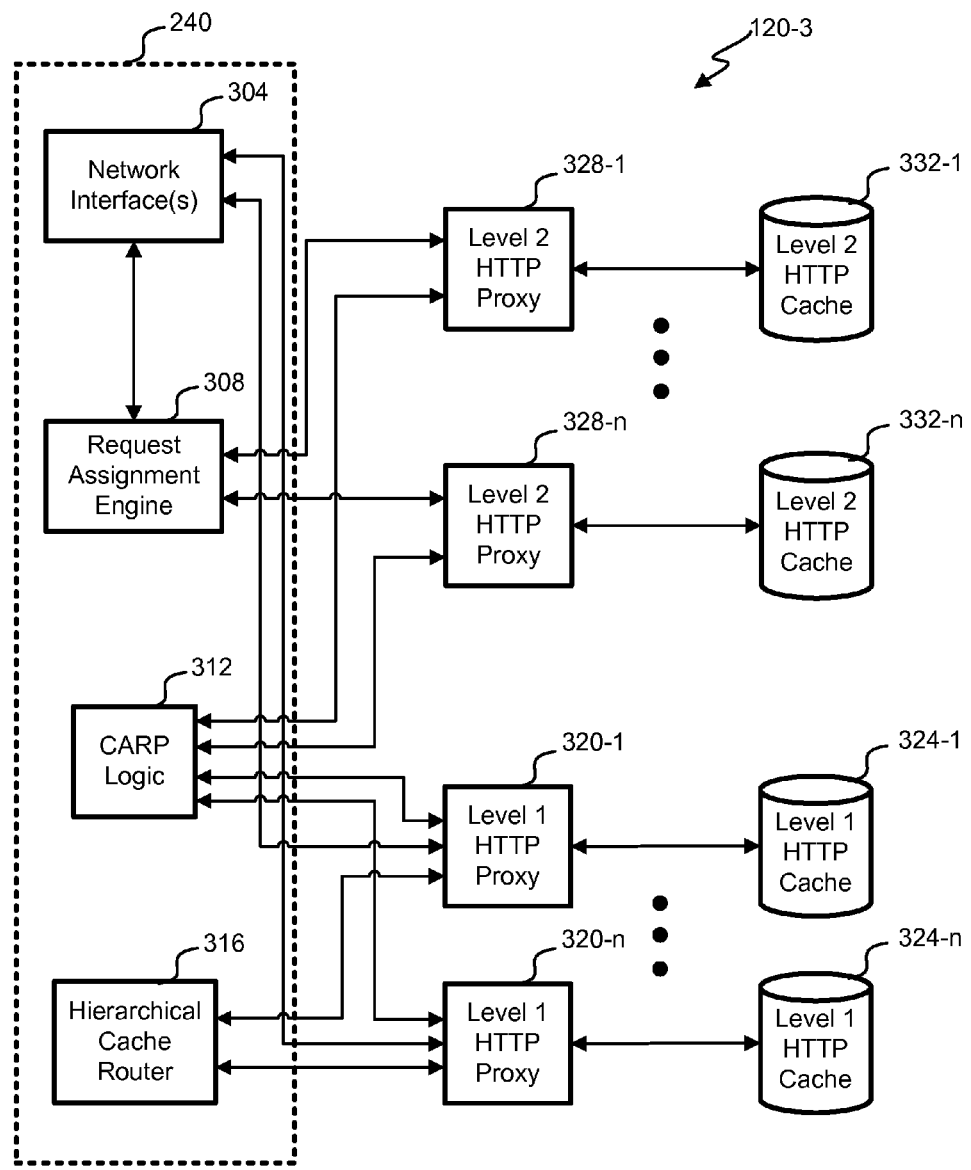

Referring next to FIG. 3C, a functional block diagram of an embodiment of various functions within a POP 120-3 is shown. This embodiment operates in two modes with one mode used for some content objects much as the embodiment of FIG. 3A operates and another mode for other content objects much as the embodiment of FIG. 3B operates. A determination is made in the level 2 HTTP proxy 328 as to whether a 302-redirect will be used to get off the Anycast VIP. Other embodiments could make the determination in the RAE 308 or network interface 304.

In this embodiment, small content objects stay on an Anycast VIP with two-level HTTP proxy and large content objects move to a VIP for the level 1 HTTP proxy 320 through the redirect process. The level 2 HTTP proxy 328 uses a code inserted into the URL to signal to the level 1 HTTP proxy 320 how to handle a particular request, but other embodiments could use a side channel, protocol handshake and/or physical path isolation. Beyond size deciding which mode, other embodiments could use application, format, encoding, customer, directory, level of QoS, loading of the HTTP proxies 320, 328, loading of the Ethernet connections in the POP, likelihood the Anycast VIP would reroute mid-delivery, etc. to decide which mode to operate in.

Figure 3D:
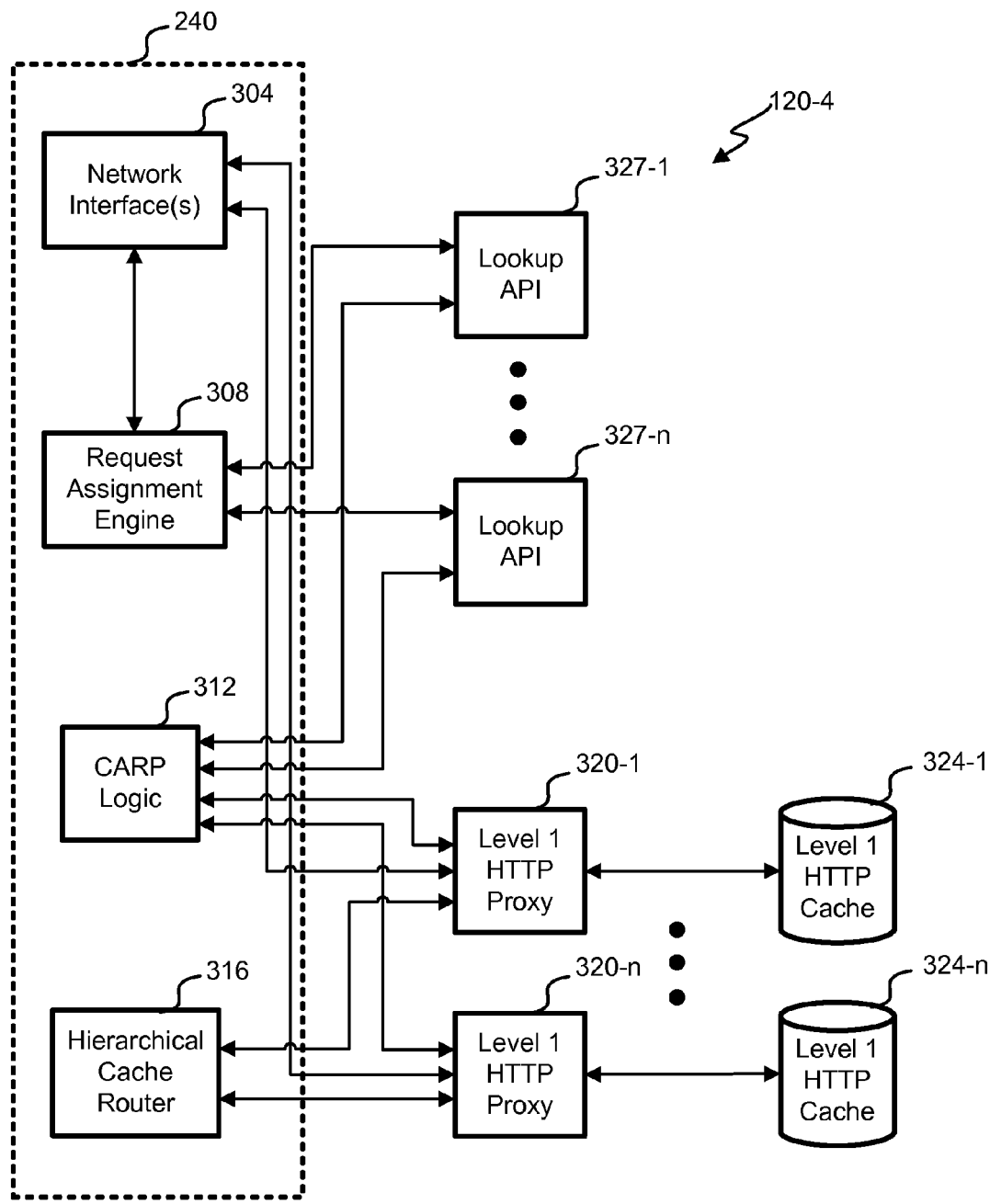

Referring next to FIG. 3D, a functional block diagram of an embodiment of various functions within a POP 120-4 is shown. This embodiment redirects a request at Anycast IP address to an XML file that includes one or more URLs that are converted to POP-specific IP addresses. An Anycast IP or Anycast VIP address is received in a request and directed by the RAE 308 to one lookup API 327 chosen from a number of lookup APIs 327. The lookup API 327 determines or retrieves XML associated with the request, for example, the XML could be a playlist having a number of URLs. The lookup API 327 interacts with the CARP logic 312 to determine which level 1 HTTP proxy 320 would be used for each URL. The CARP logic 312 could be integral to the lookup API 327. The URLs are rewritten by the lookup API 327 and the XML is returned to the end user system 102. Requests are made by a Flash™ player or other application by the end user system 102 using the URLs having the POP-specific IP addresses rather than the Anycast IP addresses that started the process.

Figure 4A:
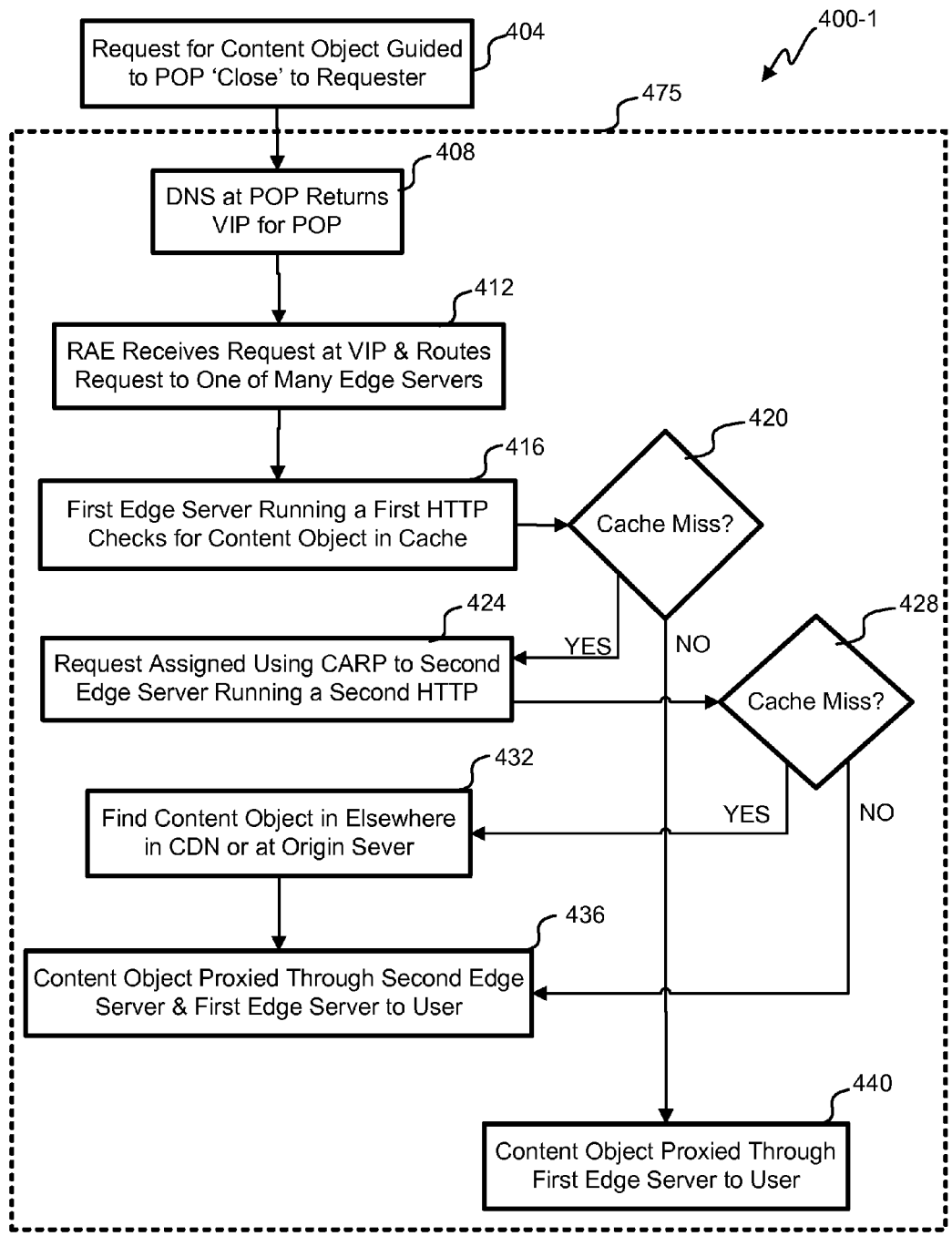
FIGS. 4A, 4B, 4C, and 4D illustrate flowcharts of embodiments of a process for delivering a content object from a POP.

With reference to FIG. 4A, a flowchart of an embodiment of a process 400-1 for delivering a content object from a POP 120 is shown. This embodiment corresponds to the functional block diagram of FIG. 3A. An end user system 102 through a browser, player or other application requests a content object that is hosted by the CDN 110. Through DNS, redirection and/or routing, the request reaches a POP 120 close in Internet terms to the end user system 102. More precisely, the POP 120 is likely close to the DNS used by the end user system 102, which may be very distant from the end user system 102 such that the POP 120 is a poor choice for delivering the content object. This embodiment uses Anycast to find the POP 120 in block 404. The DNS 250 at the POP 120 returns a VIP unique to the POP 120 that points to the edge servers.

With the VIP, the end user system 102 requests the URL with the VIP inserted. The RAE 308 receives the request before routing the request to one of the many edge servers 230 in block 412. The first edge server 230 that receives the request checks a level 2 HTTP cache 332 for the content object in block 416. Where the level 2 HTTP cache 332 has the content object as determined in block 420, processing continues to block 440 where the content object is proxied through the level 2 HTTP proxy 328 running on the edge server 230 to the end user system 102.

Where there is a cache miss in block 420, processing continues to block 424 where the level 2 HTTP proxy 328 passes the request to a CARP logic 312. The CARP logic 312 calculates a hash on the URL and finds one of the many level 1 HTTP proxies 320 corresponding to the hash. The level 1 HTTP proxy 320 checks its level 1 HTTP cache 324 for the content object. If the content object is missing, in whole or in part, it is found elsewhere in the CDN 110 or at the origin server 112 in block 432. Once the content object is located in the level 1 HTTP cache 324 or found elsewhere, the content object is proxied through the level 1 HTTP proxy 320 and the level 2 HTTP proxy 328 to the end user system 102.

Figure 4B:
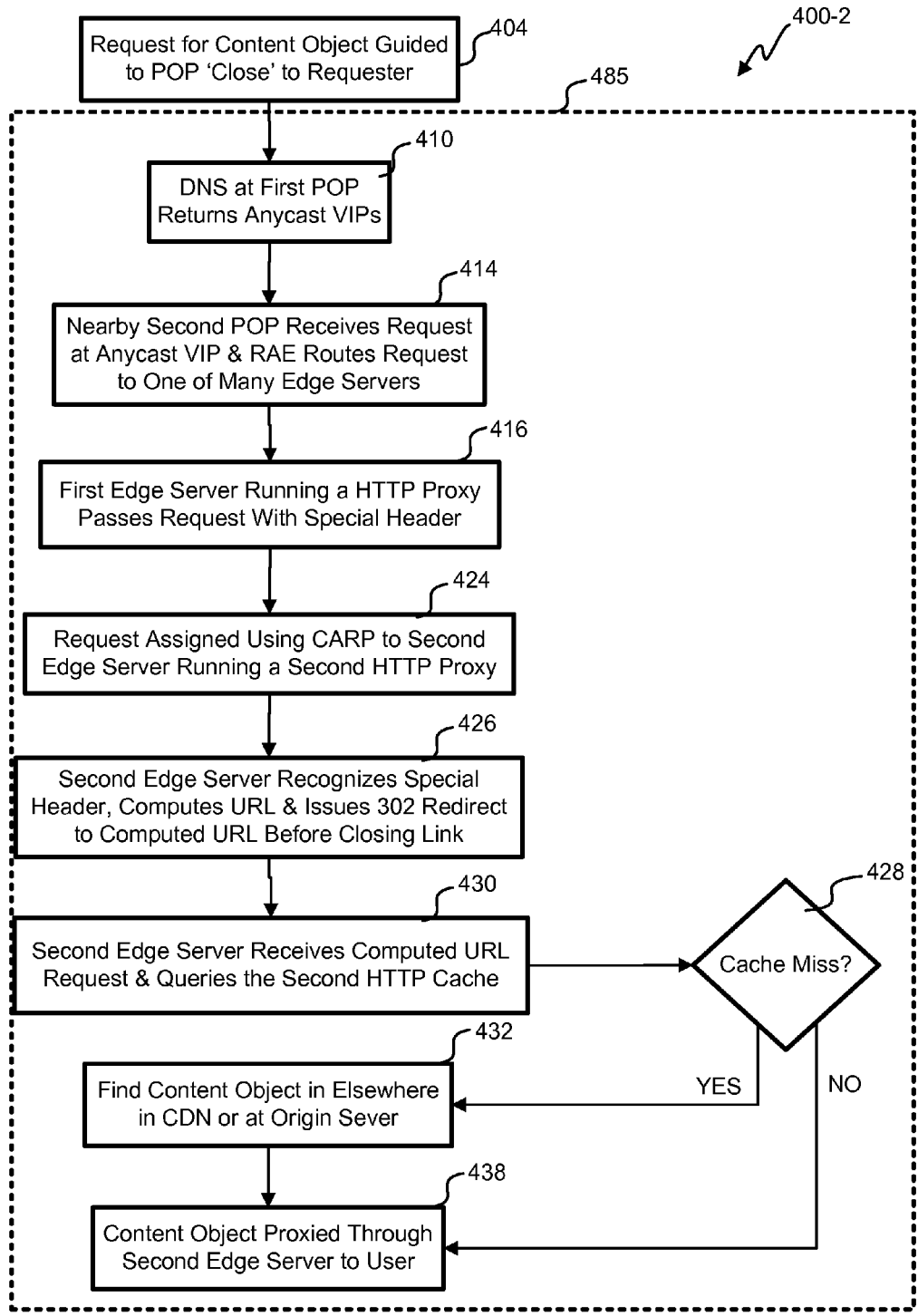

With reference to FIG. 4B, a flowchart of an embodiment of a process 400-2 for delivering a content object from a POP 120 is shown. This embodiment corresponds to the functional block diagram of FIG. 3B. The depicted portion of the process 400-2 begins in step 404 where the request or domain name resolution is delivered to a POP 120 likely close to the end user system 102. The DNS 250 at the POP 120 returns Anycast VIPs to the end user system 102. The Anycast VIPs can resolve to any number of POPs 120 throughout the CDN 110. The Anycast VIPs are different from IP addresses in that the RAE 308 could assign them to any number of edge servers 230. Other embodiments could use Anycast IP addresses that reference servers that appear in a number of POPs.

The end user system 102 request the content object at the Anycast VIP. This will resolve though the Internet to a nearby POP 120. The nearby POP 120 may or may not be the POP 120 that was used in block 410 for the DNS resolution. In block 414, the received request is processed by the RAE 308 for assignment to one of many edge servers 230. The RAE 308 in this embodiment does round robin assignment between a number of the edge servers 230 with the right capability that were assigned to the customer.

In block 416, a level 2 HTTP proxy 328 on the edge server 230 passes the request with a special header indicating the request came from an Anycast VIP to the CARP logic 312. Using CARP, the CARP logic 312 assigns the request to a second edge server 230 running level 1 HTTP proxy 320. After recognizing the special header, the level 1 HTTP proxy 320, a unique URL is computed that refers back to the level 1 HTTP proxy 320 in block 426. A 302-redirect is issued to the end user system 102 to relay back the computed URL through the two HTTP proxies 328, 320 before the link is closed.

The end user system 102 requests the computed URL to issue it back to the level 1 HTTP proxy 320 in block 430. The level 1 HTTP cache 324 is also queried. On a cache miss determined in block 428, the content object is found and loaded into the level 1 HTTP cache 324 in block 432. For a cache hit or after the content object is loaded in the cache in block 432, the content object is proxied through the level 1 HTTP proxy to the end user system 102.

Figure 4C:
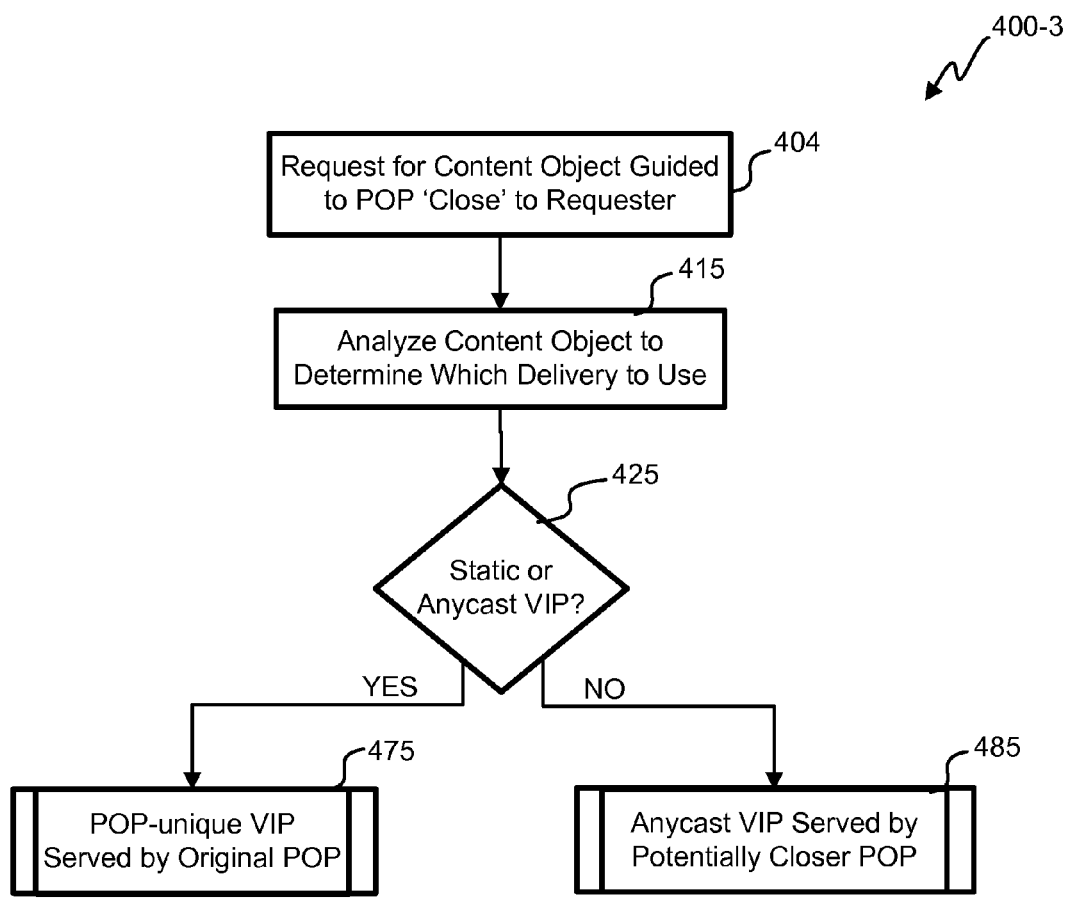

With reference to FIG. 4C, a flowchart of an embodiment of a process 400-3 for delivering a content object from a POP 120 is shown. This embodiment corresponds to the functional block diagram of FIG. 3C. After finding the POP in block 404, the content object is analyzed to determine whether an Anycast VIP should be used or not in block 415. The determination in block 425 for this embodiment uses an Anycast VIP for large content objects and a POP-unique VIP for small content objects. Depending on that determination, either a first group of blocks 475 from FIG. 4A are performed or a second group of blocks 485 from FIG. 4B are performed. Any number of factors can be used in the determination of block 425 to decide which mode to operate in.

A number of variations and modifications of the disclosed embodiments can also be used. For example, two banks of edge servers are shown in FIG. 2, but it is to be understood that the banks could be the same bank. One hardware edge server 230 could simultaneously run both any number of level 2 HTTP proxy and any number level 2 HTTP proxy. Additional functions could also run on a hardware server such as DNS, RAE, CARP logic, etc. In another example, we discuss the Anycast VIPs changing from a first POP to a second POP, but that is not necessarily the case. Often, the POP chosen during DNS resolution is also the POP that will receive the redirected request.

Figure 4D:
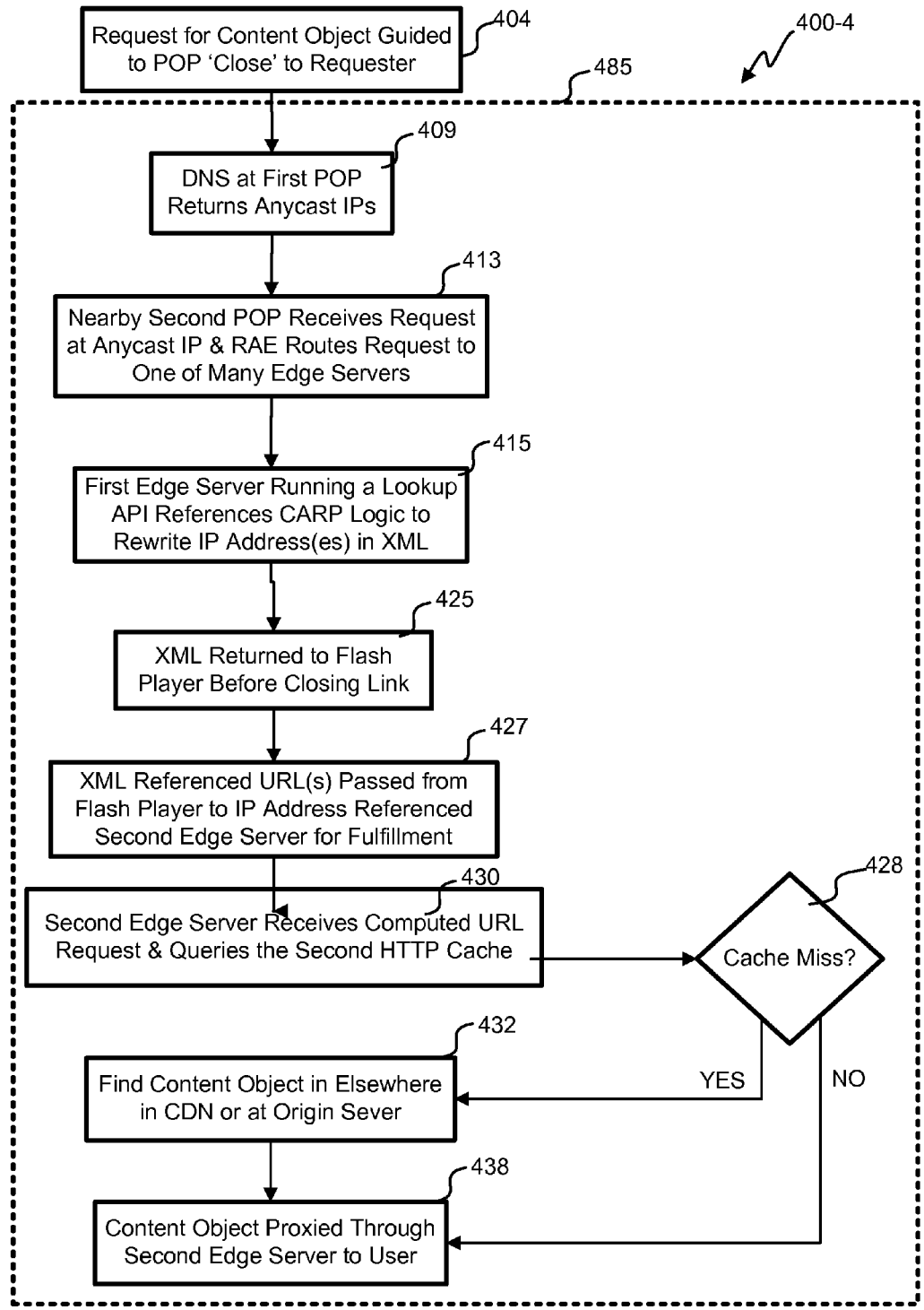

With reference to FIG. 4D, a flowchart of an embodiment of a process 400-4 for delivering a content object from a POP 120 is shown. The depicted portion of the process begins in block 404 where the request for content uses DNS, Anycast or routing to find a POP 120 close to the requestor or at least their DNS server. The DNS server 250 at the POP 120 returns Anycast IP addresses for the domain, but could return VIP addresses in other embodiments.

With the Anycast IP addresses, the end user device 102 requests the URL. In this embodiment, a Flash™ player on the end user device 102 is requesting a XML playlist containing a number of URLs that could be video or audio clips, for example. In block 413, a second POP nearby the end user device 102 receives the request on the Anycast IP address. The second POP could be the same as the first POP in some cases, but could be in a completely different geographic location in some instances. The RAE 308 routes the request to one of many lookup APIs 327.

With the URL request, the lookup API 327 retrieves or formulates a XML file corresponding to the URL in block 415. The URLs are rewritten after using the CARP logic 312 to determine the server(s) in the POP that would be servicing each URL. After conversion, the IP addresses are POP-specific. In block 425, the rewritten XML is returned to the Flash player before closing the link on the Anycast IP address.

In block 427, the URLs are passed from the Flash™ player to the POP-specific IP address for fulfillment. The level 1 HTTP proxy 320 will locate the content object referenced by the URL in the level 1 HTTP cache 324 or elsewhere and return it in blocks 430, 428, 432, and 438. For each URL these blocks 430, 428, 432, 438 will reference the appropriate level 1 HTTP proxy 320 and return the content object. While this embodiment uses an XML file with redirection to POP-specific IP addresses, any type of file or control information could be used to redirect away from Anycast IP addresses in other embodiments.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for assigning a server of a content delivery network (CDN), the method comprising:
   receiving a request for a content object at a first point of presence (POP), which is one of a plurality of POPs that comprise the CDN and are distributed across the Internet;
   returning a first Internet protocol (IP) address, which routes to any of the plurality of POPs using Anycast;
   receiving the request at a second POP using the first IP address;
   redirecting a user computer to request the content object from the second POP using a second IP address instead of the first IP address, wherein:
      the second POP provides the second IP address to the user computer;
      the second IP address is unique to the second POP; and
      the second IP address is not an Anycast IP address;
   receiving the request at the second POP using the second IP address, responsive to a request from the user computer;
   determining a server device associated with the second IP address; and
   serving the content object from the second POP, using the server device addressed by the second IP address, to the user computer.

2. The method for assigning the server of the CDN as recited in claim 1, wherein one or both of the first and/or second IP addresses is a virtual IP address.

3. The method for assigning the server of the CDN as recited in claim 1, wherein the redirecting uses a 302 redirect.

4. The method for assigning the server of the CDN as recited in claim 1, further comprising proxying the serving of the content object through a second physical server different from the server device and located between the server device and the user computer.

5. The method for assigning the server of the CDN as recited in claim 1, wherein the determining comprises selecting the server device from a plurality of servers.

6. The method for assigning the server of the CDN as recited in claim 1, wherein the first POP is found with the user computer using Anycast.

7. The method for assigning the server of the CDN as recited in claim 1, wherein the determining is performed deterministically using a CARP algorithm.

8. The method for assigning the server of the CDN as recited in claim 1, wherein the first POP and second POP are in one geographic location.

9. A machine-readable physical medium having machine-executable instructions, comprising code for:
   receiving a request for a content object at a first point of presence (POP), which is one of a plurality of POPs that comprise the CDN and are distributed across the Internet;
   returning a first Internet protocol (IP) address, which routes to any of the plurality of POPs using Anycast;
   receiving the request at a second POP using the first IP address;
   redirecting a user computer to request the content object from the second POP using a second IP address instead of the first IP address, wherein:
      the second POP provides the second IP address to the user computer;
      the second IP address is unique to the second POP; and
      the second IP address is not an Anycast IP address;
   receiving the request at the second POP using the second IP address, responsive to a request from the user computer;
   determining the server associated with the second IP address; and
   serving the content object from the second POP, using the server addressed by the second IP address, to the user computer.

10. The machine-readable physical medium having machine-executable instructions as recited in claim 9, wherein one or both of the first and/or second IP addresses is a virtual IP address.

11. The machine-readable physical medium having machine-executable instructions as recited in claim 9, wherein the code for redirecting uses code for a 302 redirect.

12. The machine-readable physical medium having machine-executable instructions as recited in claim 9, further comprising code for proxying the serving of the content object through a second physical server different from the server and located between the server and the user computer.

13. The machine-readable physical medium having machine-executable instructions as recited in claim 9, wherein the determining comprises selecting the server from a plurality of servers.

14. The machine-readable physical medium having machine-executable instructions as recited in claim 9, wherein the server is a caching proxy server.

15. A CDN for delivering a plurality of content objects to user computers, the CDN comprising:
- a plurality of POPs distributed across the Internet including a first POP and a second POP;
- a domain name service to return a first Internet protocol (IP) address, wherein:
  - the first IP address that routes to any of the plurality of POPs using Anycast, and
  - the first IP address is associated with a request for a content object at the first POP;
- switch fabric that receives the request at a second POP using the first IP address;
- a plurality of servers that redirect a user computer to request the content object from the second POP using a second IP address instead of the first IP address, wherein:
  - the second POP provides the second IP address to the user computer,
  - the second IP address is unique to the second POP,
  - the second IP address is not an Anycast IP address,
  - the plurality of servers include a server device,
  - the second POP receives a second request for the content object at the second IP address, responsive to a request from the user computer, and
  - the switch fabric determines the server device associated with the second IP address; and
  - the server device, associated with the second IP address, delivers the content object from the second POP to the user computer.

16. The CDN for delivering the plurality of content objects to user computers as recited in claim 15, wherein one or both of the first and/or second IP addresses is a virtual IP address.

17. The CDN for delivering the plurality of content objects to user computers as recited in claim 15, wherein the redirection of the user computer uses a 302 redirect.

18. The CDN for delivering the plurality of content objects to user computers as recited in claim 15, wherein the serving of the content object is proxied through a second physical server different from the server device and located between the server device and the user computer.

19. The CDN for delivering the plurality of content objects to user computers as recited in claim 15, wherein the server device is a caching proxy server.

20. The CDN for delivering the plurality of content objects to user computers as recited in claim 15, wherein the first POP is found with the user computer using Anycast.

* * * * *